United States Patent [19]
Rocher et al.
[11] 3,732,543
[45] May 8, 1973

[54] LOOP SWITCHING TELEPROCESSING METHOD AND SYSTEM USING SWITCHING INTERFACE

[75] Inventors: Edouard Y. Rocher, Ossining; Stanley E. Schuster, Granite Springs, both of N.Y.

[73] Assignee: International Business Machines Corporation, Armonk, N.Y.

[22] Filed: June 30, 1971

[21] Appl. No.: 158,320

[52] U.S. Cl. ..........................340/172.5, 179/15 AL
[51] Int. Cl. ............................H04j 5/00, G06f 9/00
[58] Field of Search .......................340/172.5; 179/15

[56] References Cited

UNITED STATES PATENTS 3,245,043 4/1966 Gaffney, Jr. et al. ..............340/172.5

*Primary Examiner*—Gareth D. Shaw
*Attorney*—Hanifin and Jancin and John J. Goodwin

[57] ABSTRACT

A method and system is described for handling digital information in the form of addressed messages. The system includes a master communication loop such as a transmission cable. A plurality of sub-loops as well as devices are connected to the master loop through suitable interface units and sub-loop control units. In each of the sub-loops a plurality of devices capable of transmitting and receiving digitally coded messages are connected to the sub-loops through interface units. Two special characters precede the message and permits a sub-loop control unit to take control of the loop to transmit messages and to obtain further messages from the devices in the associated sub-loop. When a unit is permitted to transmit, it produces and transmits a third special character which is received by the other interfaces or stations which are ready to transmit and informs the other interfaces that they may not transmit. After an interface transmits its message or messages, it produces the first and second special characters which is received by the next interface in the loop that is ready to transmit and in this manner, the sequence of transmission is passed around the loop under the control of the interfaces in the loop.

4 Claims, 7 Drawing Figures

INVENTORS
EDOUARD Y. ROCHER
STANLEY E. SCHUSTER
BY John J. Goodwin
ATTORNEY

LOOP SWITCHING TELEPROCESSING METHOD AND SYSTEM USING SWITCHING INTERFACE

BACKGROUND OF THE INVENTION

1. Field of the Invention

This invention relates to digital data communication system and their method of operation with closed cable loops which emanate and return to a system controller. More particularly, the invention relates to a multi-loop hierarchical system wherein sub-loops having digital terminals connected thereto are in turn connected to a master loop.

2. Prior Art

Closed loop communication systems containing a plurality of terminal units whose transmission is controlled by instruction characters are known. In Belgian Pat. No. 724,318 assigned to Svenska Handelsbanken, a system is described wherein a single loop having "-subordinated" terminal units is controlled by a "superior pulse apparatus". The distinction between this reference and the present invention is that all the messages are sent to or come from the superior pulse apparatus rather than being sent directly from station to station. Consequently, the reference does not teach the means of byte resynchronization after transmission. Also, the reference does not teach the concept of locating the terminals in sub-loops which are interconnected with a master loop via sub-loop control units which form a portion of the present invention.

A publication entitled "An Experimental Distributed Switching System to Handle Bursty Computer Traffic" by W.D. Farmer and E.E. Newhall, published by the ACM Symposium on Problems in the Optimization of Data Communication, Pine Mountain, Ga. (Oct. 13–16, 1969) pgs. 1–34, discusses a transmission system in which sub-loops are connected to a main loop but which are under the control of a central computer. In addition, the reference does not teach the concept of eliminating the logical delay of at least one bit in each unit connected to the loop.

SUMMARY

The present invention is distinct over the cited references in that the present invention does not intend to cover the concept of multi-terminal switching in a loop or the concept of a hierarchical loop system. The present invention is directed to a hierarchical loop system using unique framing characters for polling the stations wherein the stations control the loop switching. The present invention also provides a simple interface and sub-loop control unit.

The foregoing and other objects, features and advantages of the invention will be apparent from the following more particular description of the preferred embodiments of the invention, as illustrated in the accompanying drawings.

BRIEF DESCRIPTION OF THE DRAWINGS

FIG. 1 illustrates a single loop switching system, the description of which will be useful in understanding the multi-loop hierarchical system to be later explained. The loop includes a plurality of stations 1, 2, 3, 4 --- N connected in series via a unidirectional clock wise cable, telephone pair, coaxial cable or the like. All the stations are similar except that consisting of the loop controller 12 and interface 14 which must also maintain bit and byte synchronization on the loop and therefore includes a conventional clock circuit and a 2 bytes delay device, the purpose of which will be explained in more detail later. Thus, a plurality of stations are connected to transmission line 10, each station consisting of a device or a plurality of devices, 16-1, 16-2, 16-3 through 16-N which are connected to transmission lines by interfaces 14-1, 14-2, 14-3 through 14-N, respectively. Devices 16-1 through 16-N are apparatus which may transmit or receive digital data. For example, devices 16-1 through 16-N may be typewriters, display units, digital telephones or computers. Each device, through its interface, is capable of transmitting or receiving messages to or from any other devices in the loop. The transmission from the station is initiated by the transmission of a unique framing character P1 from control unit 12 which is transmitted clockwise around the loop. The unique character P1 is not permitted to appear in the data stream. For that purpose, different techniques can be used, like bit insertion and bipolar violation. In what follows, it will be supposed that bit insertion is used and that the P1 character consists of a succession of 7 "ones" followed by a "zero".

Referring to FIG. 2, block diagram of the interface is illustrated. The interface includes a receive register R which is typically a shift register one character (i.e. 8 bits) long and a transmit register T which is also a shift register one character long. The registers R and T are connected to the line 10 and are operated by a controller circuit 18. Register R receives data from the line 10 and transmits it to the device 16 under control of the control circuit 18. Register T receives data from the device 16 and transmits it on to line 10 under control of the controller circuit 18. The messages are received and transmitted through the interface unit in the form of a series of digital bits forming message words. A switch 20 is provided in series with line 10 which is capable of opening the loop.

Figure 1:
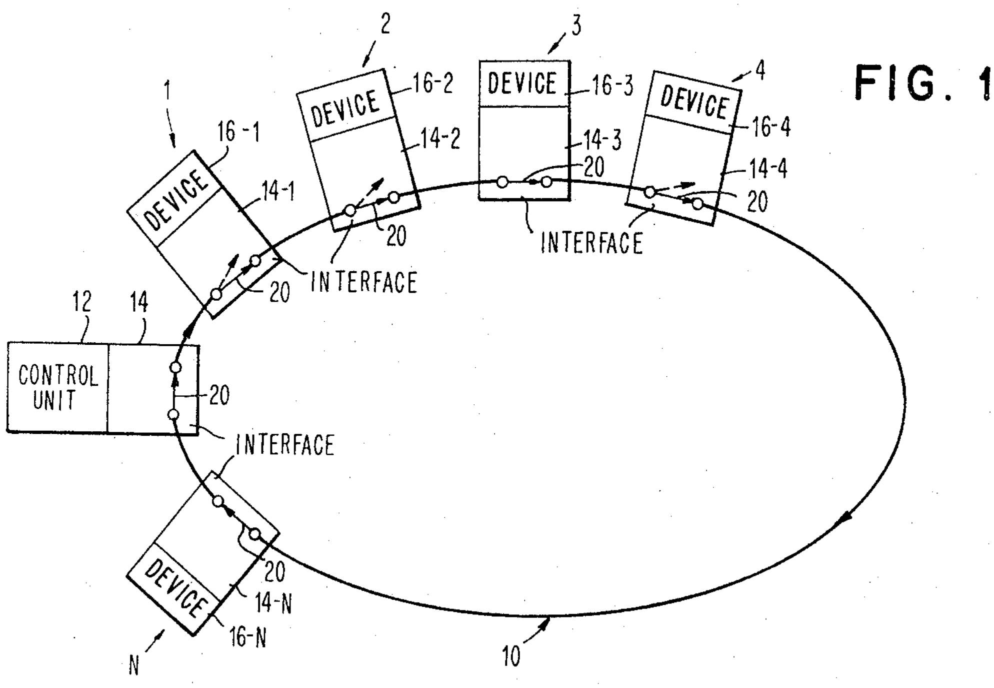
FIG. 1 is an illustration of a single closed loop switching transmission system useful in explaining the present invention.

The system operates in given cycles which are generated by control unit 12. Prior to the initiation of a cycle, the switch 20 of all the stations are closed and certain stations are ready to transmit. In the present example, it will be presumed that stations 1, 2 and 4 are ready to transmit messages. As previously stated, the messages are in digital form and are preceded by an address indicating the station which is meant to receive the message. The cycle of operation is commenced by the transmission from control unit 12 of the unique digital character which was previously referred to as P1. The P1 character is received by the R registers of all the stations and it is decoded in the controller thereof, and at the stations that are ready to transmit, each switch 20 is opened as depicted by the dotted lines for the switches of stations 1, 2 and 4. After transmitting the P1 character, control unit 12 transmits a special character which will be referred to as the P2 character.

Due to the open switch condition at station 1, station 1 is the only station that will receive the P2 character. The P2 character is decoded indicating that station 1 may transmit. At the same time that the P2 character is being received and decoded, station 1 generates and transmits through register T another special character which will be represented by the designation "$\overline{P2}$" and has to be different from P2. The $\overline{P2}$ character is received by station 2 and decoded; it indicates to station 2 that it may not transmit and the controller in interface 2 causes the switch thereof to close. Also at the same time the $\overline{P2}$ character is received by interface 2, interface 2 generates a $\overline{P2}$ character which is transmitted along the line. The $\overline{P2}$ character transmitted by station 2 is received by 4 and is decoded causing the switch at station 4 to close. Station 4 also generates a $\overline{P2}$ character which is transmitted along the line. In this manner, all the succeeding stations which were in the condition to transmit are instructed that they may not transmit and that the switches should be closed. All the switches close simultaneously except for the propagation delay. In the same manner, interface 14 receives a $\overline{P2}$ character and closes its switch after proper byte resynchronization, as will be described later. Stations which are not ready to transmit, such as station 3, are not affected by the $\overline{P2}$ characters because their switches are already closed. Thus, although the P1 character informed all the stations that were ready to transmit and that transmission could occur, the operation of the P2 and the $\overline{P2}$ characters served to inhibit transmission from all the stations except station 1.

Station 1 now transmits its message. Station 1 may have a single message to transmit or a plurality of messages. In the case of the single message, after the transmission of the message has been completed as indicated by an end-of-message character, station 1 transmits a P1 character to line 10 through the T register. The P1 character is received by all the other interfaces 2, 3, ... N, and 14 in the loop and informs them that they are conditionally invited to transmit. It also returns to the receiver of station 1. Thus, in the present example, the switches of interface 14-2 and 14-4 are opened upon reception and decoding of the P1 character from station 1. Following the transmission of the P1 character, station 1 transmits a P2 character which is received only by station 2 due to the open switch condition of interface 14-2. The reception of the P2 character at station 2 informs the station that it may transmit and station 2 at the same time transmits a $\overline{P2}$ character from its T register which is received by station 4 where it is decoded and causes switch of interface 14-4 to close. In effect, the $\overline{P2}$ character has informed station 4 that it is not permitted to transmit. Station 2 then transmits its message which, is looked at by all the other stations, 3 through N and 14, 1 and 2; by virtue of its address, the message is taken by the chosen interface and is passed to the attached device. At the completion of the message, station 2 transmits a P1 character followed by a P2 character in the same manner as had station 1. It can be seen that during a cycle, each station will be able to transmit once and only once in sequence, as permission to transmit is transferred from station to station in a manner which will be referred to hereinafter as ratcheting.

It was presumed in the previous explanation that the stations had only one message to transmit. However, it is possible that a sequence of separate messages may be transmitted at a given time from a station. In this situation, (FIG. 3) all messages except the last message are followed by a P1 character and a $\overline{P2}$ character, instead of being followed by a P1 character and a P2 character in order that the ability to transmit may still remain with the transmitting station. At the end of the last message, however, a P1 character and a P2 character are transmitted so that the ability to transmit may be switched to the next station that is ready.

Figure 3:
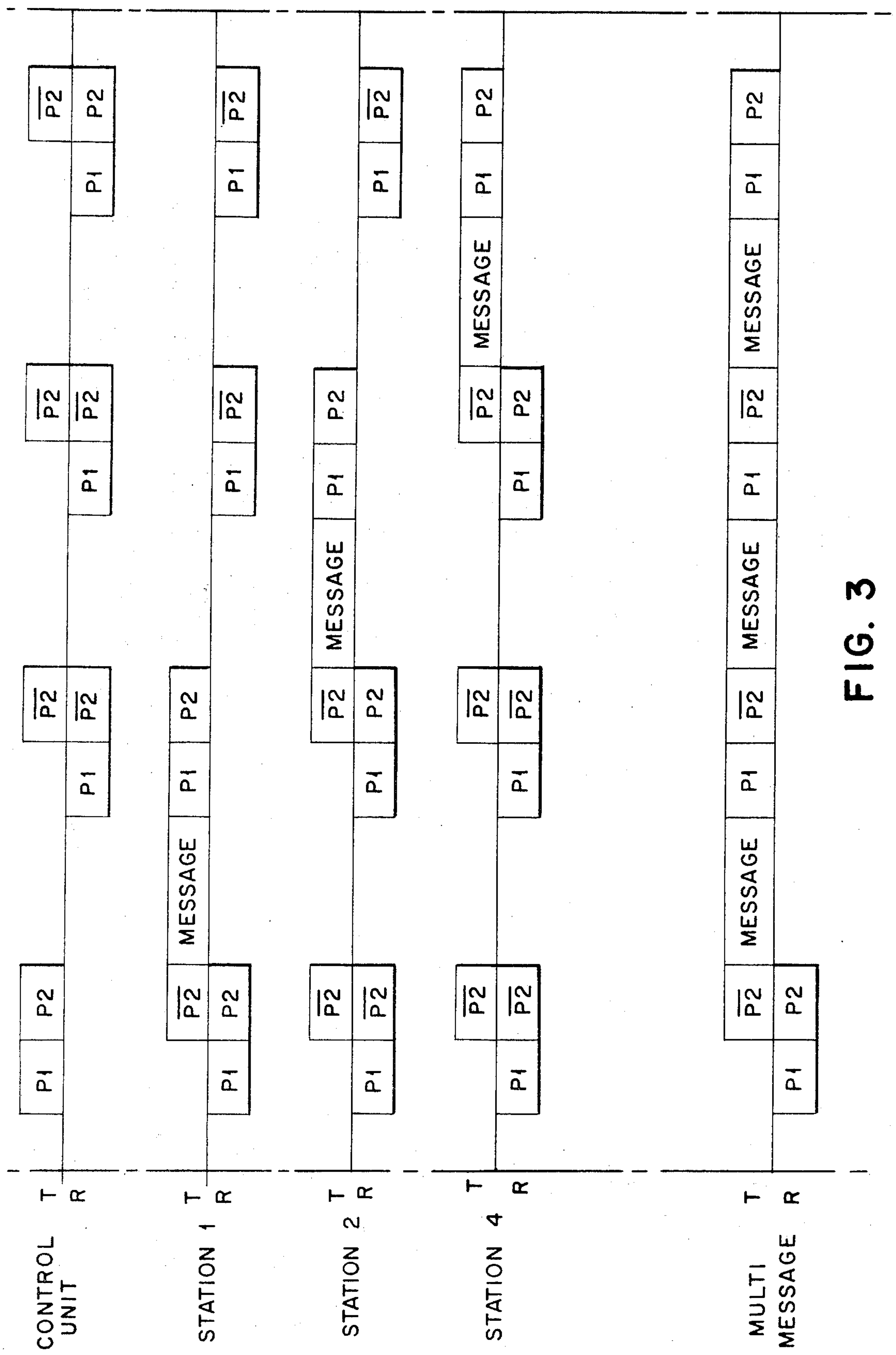
FIG. 3 is a timing diagram illustrating the operation of the system of FIG. 1.

An understanding of operation of the switching loop of FIG. 1 may be aided by referring to the timing diagram illustrated in FIG. 3. In FIG. 3, it is seen that the control unit produces a P1 character followed by a P2 character. The P1 character is received at all stations and in particular, at stations 1, 2 and 4 which are ready to transmit and therefore opens their switches. At the same time, station 1 is receiving the P2 character, it is generating a $\overline{P2}$ character. The $\overline{P2}$ character generated by station 1 is received by stations 2. Station 4 also received a $\overline{P2}$ character generated by station 2. The $\overline{P2}$ indicates that they may not transmit and their switches are closed. Station 1 is the only station to receive a P1, P2 sequence, its switch remains open. Station 1 then transmits its message followed by a P1 and a P2 character. The P1 character is received by all stations and in particular, by stations 2 and 4 which want to transmit. Station 2 receives the P2 character from station 1 while it is generating a $\overline{P2}$ character. This $\overline{P2}$ character is received at station 4 which indicates that it may not transmit and its switch is opened. Station 2 transmits its message which is followed by a P1 and a P2 character. The P1 character is received at all stations and in particular, by station 4 which wants to transmit. The P2 character is also received at station 4 inviting it to transmit. Station 4 produces a $\overline{P2}$ character followed by its message which, in turn, is followed by a P1 and a P2 character. The P1 and P2 characters following the message of the last station to transmit is received by the control unit and indicates that a new cycle may be initiated by the control unit.

At the bottom of FIG. 3, an example is given of the operation of a station when there is more than one message to be transmitted. The station receives the P1 and P2 characters and produces a $\overline{P2}$ character, after which the message is transmitted. The message is followed by a P1 character and a $\overline{P2}$ character so that the next station to transmit will be informed that it may not transmit. The second message is then transmitted and is followed by a P1 character and a $\overline{P2}$ character for the reasons stated above. The last message is followed by a P1 character and a P2 character and the next station to transmit is thus informed. As previously stated, each message as shown in FIG. 3 consists of binary data indicating the address to which the message is being sent, the address from which the message is being sent, control information, the message data itself, and a check character.

Figure 4:
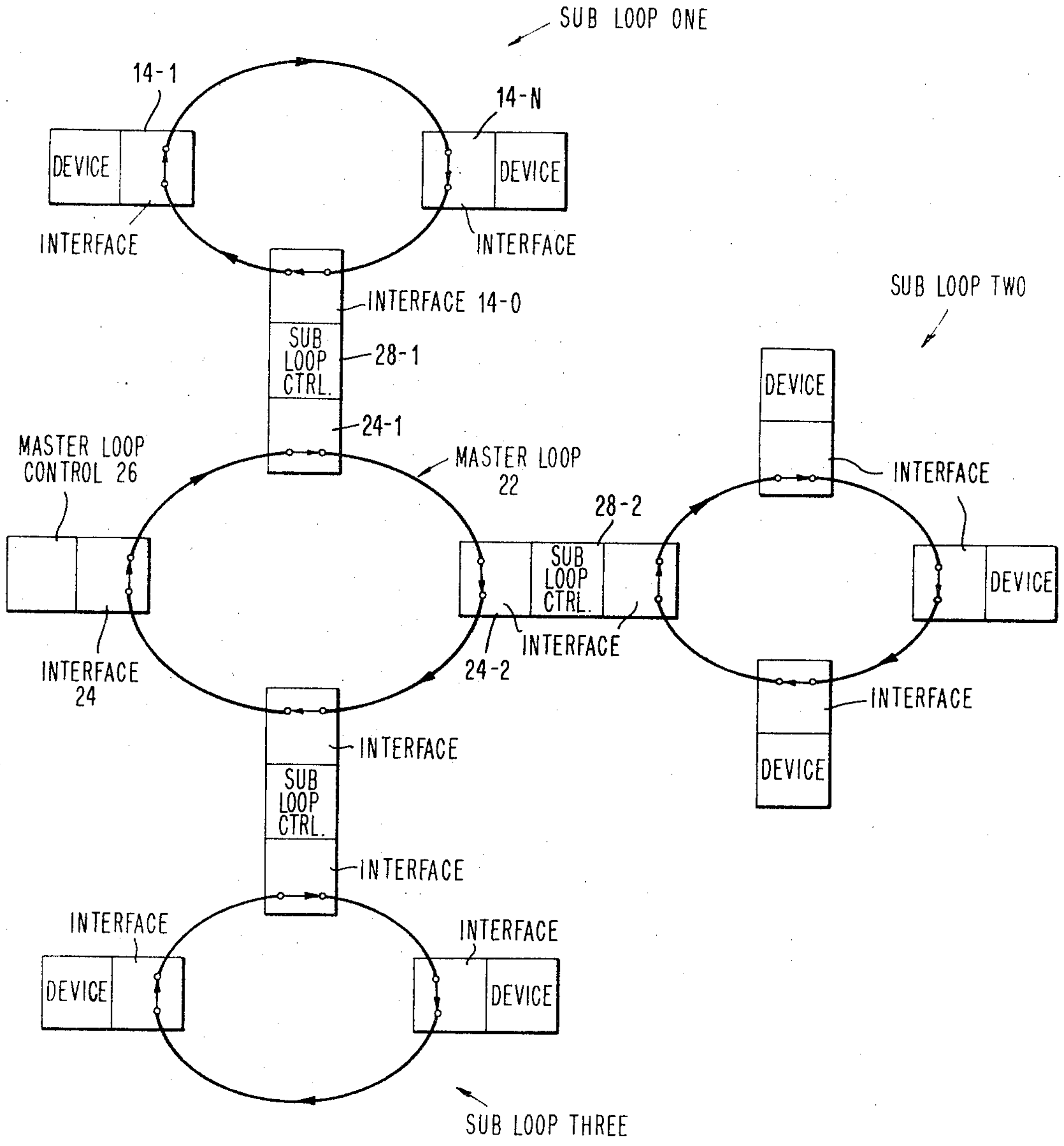
FIG. 4 is an illustration of a multi-loop hierarchical system for loop switching.
Figure 5:
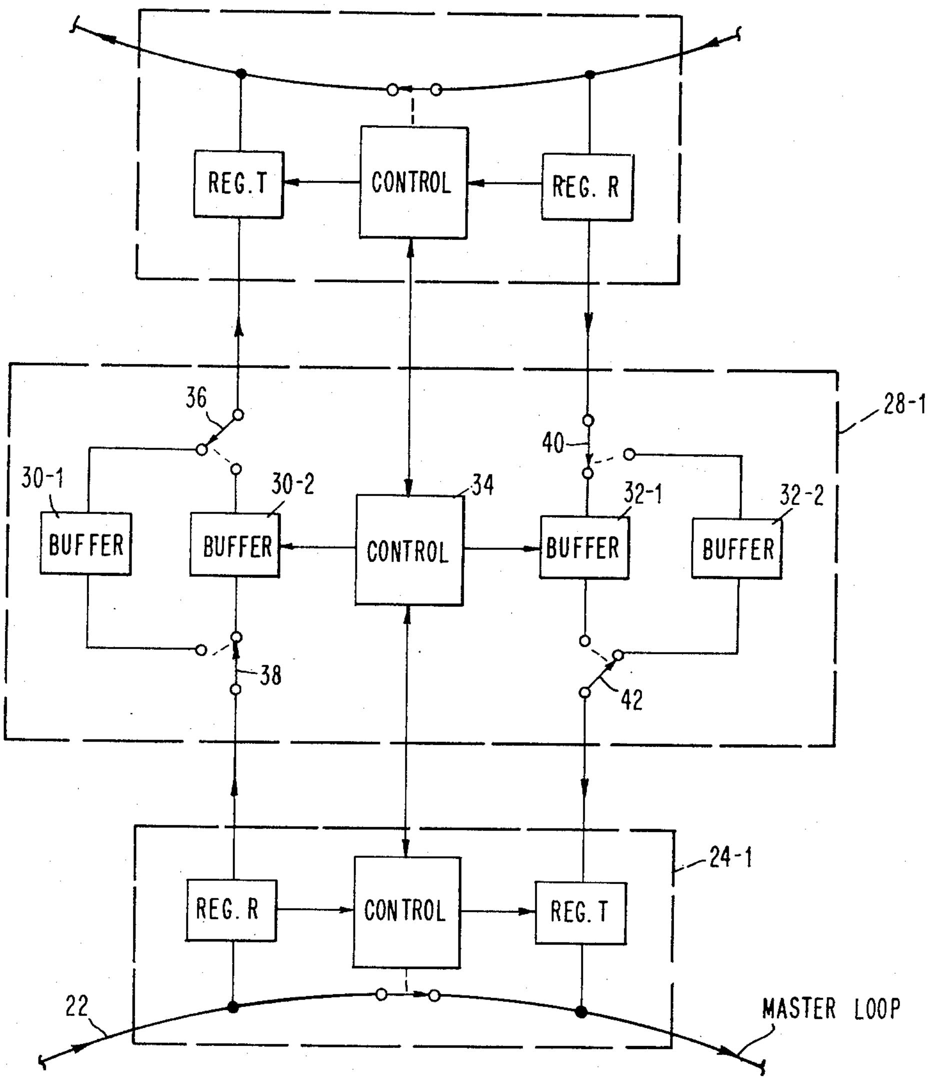
FIG. 5 is a block diagram of a sub-loop control unit used in the system of FIG. 4.

In a single loop system, as shown in FIG. 1, a single station failure will affect the operation of the entire loop. The multi-loop system of FIG. 4 overcomes this problem. As illustrated in FIG. 4, the system is broken down into a plurality of sub-loops, each connected to a master loop. Thus, failure of a station in one sub-loop does not affect the operation of the stations in the other sub-loops. Another advantage of the system of FIG. 4 is a plurality of devices which are located in a particular location may be assigned to one sub-loop and other devices located elsewhere may be assigned to another sub-loop. For example, a group of typewriters and displays in one building may be placed in a first sub-loop whereas several computers located in another geographical location may be assigned to another sub-loop. In the system of FIG. 4, a master loop 22 is connected through an interface 24 to a master loop controller 26. Interface 24 and all the other interfaces depicted in FIG. 3 are identical to those used in FIG. 1 and as is shown more particularly in FIG. 2. The connection between the master loop and the sub-loops which, in the present example, were selected to be three in number, are made with an interface in the master loop and an interface in the sub-loop which are interconnected by a sub-loop control unit 28. The sub-loop control unit is shown in more detail in FIG. 5. In FIG. 5, an interface is shown connected to the master loop and a second interface is shown connected to the sub-loop in a manner previously described. However, instead of being connected to a device, both interfaces are interconnected by the sub-loop control unit 28. The sub-loop control unit includes two pairs of buffer storage registers 30-1, 30-2 and 32-1, 32-2, which operate under the control of sub-loop control unit 34. Buffer registers 30-1 and 30-2 may be selectively connected to the transmit register T of the sub-loop interface by means of switch 36. The other side of buffer registers 30-1 and 30-2 may be selectively connected to the receive register R of the master loop interface by means of switch 38. Likewise, buffer registers 32-1 and 32-3 may be selectively coupled to the receive register R of the sub-loop interface through switch 40 and the other side of buffer registers 32-1 and 32-2 may be selectively connected to the transmit register T of the master loop interface by means of switch 42. The registers T and R in the interfaces store only the P1 and P2 characters and therefore need only be one character (8 bits) long since the messages from the devices are shifted through the registers but are not stored by either the R or T registers. However, the buffer storage registers 30-1, 30-2, and 32-1, 32-2 will store for one cycle all the messages to or from the devices within their associated sub-loop. Thus, the buffer storage registers may require storage capabilities of several thousand bits, depending on the particular system and the types of messages within the system.

The system of FIG. 4 operates in successive cycles, each of which is initiated by transmission of a P1 and P2 characters from the master loop control Unit 26. During a previous cycle, the messages from the various devices in the sub-loops were collected and stored in the buffer registers 32 in the sub-loop control units and are ready for transmission. Also during a previous cycle, the messages from other sub-loops which are to be sent to devices in a given sub-loop were received and stored in the buffer register 30 of the sub-loop control unit for the given sub-loop. At the beginning of the present cycle, the master loop control Unit 26, through its interface 24 produces a P1 and a P2 character and closes its switch; then the messages from the sub-loops are transmitted and received by the ratcheting technique previously described. That is, sub-loop control unit one, upon reception of the P1 and P2 characters generatee a $\overline{P2}$ character if it wants to transmit, and thereafter transmit its stored messages. After transmission has ended, the sub-loop control unit for sub-loop one produces a P1 and P2 character on master-loop 22 so that the next sub-loop control unit that is ready to transmit may do so.

At the same time sub-loop control unit one receives the P1, P2 reference from master loop 22, it initiates a new cycle in its own sub-loop by transmitting first the messages stored in buffer 30 followed by a P1, P2 so that the next station of the sub-loop that is ready to transmit may do so. Messages coming from the stations are stored in buffer 32 or passed around the sub-loop.

Figure 2:
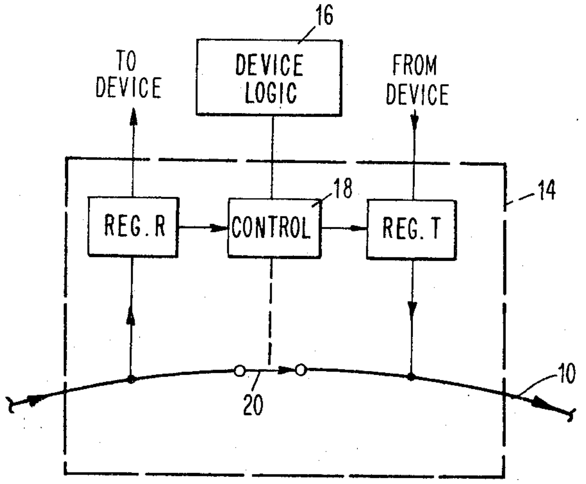
FIG. 2 is an illustration in block diagram form of an interface used in the present invention.
Figure 6:
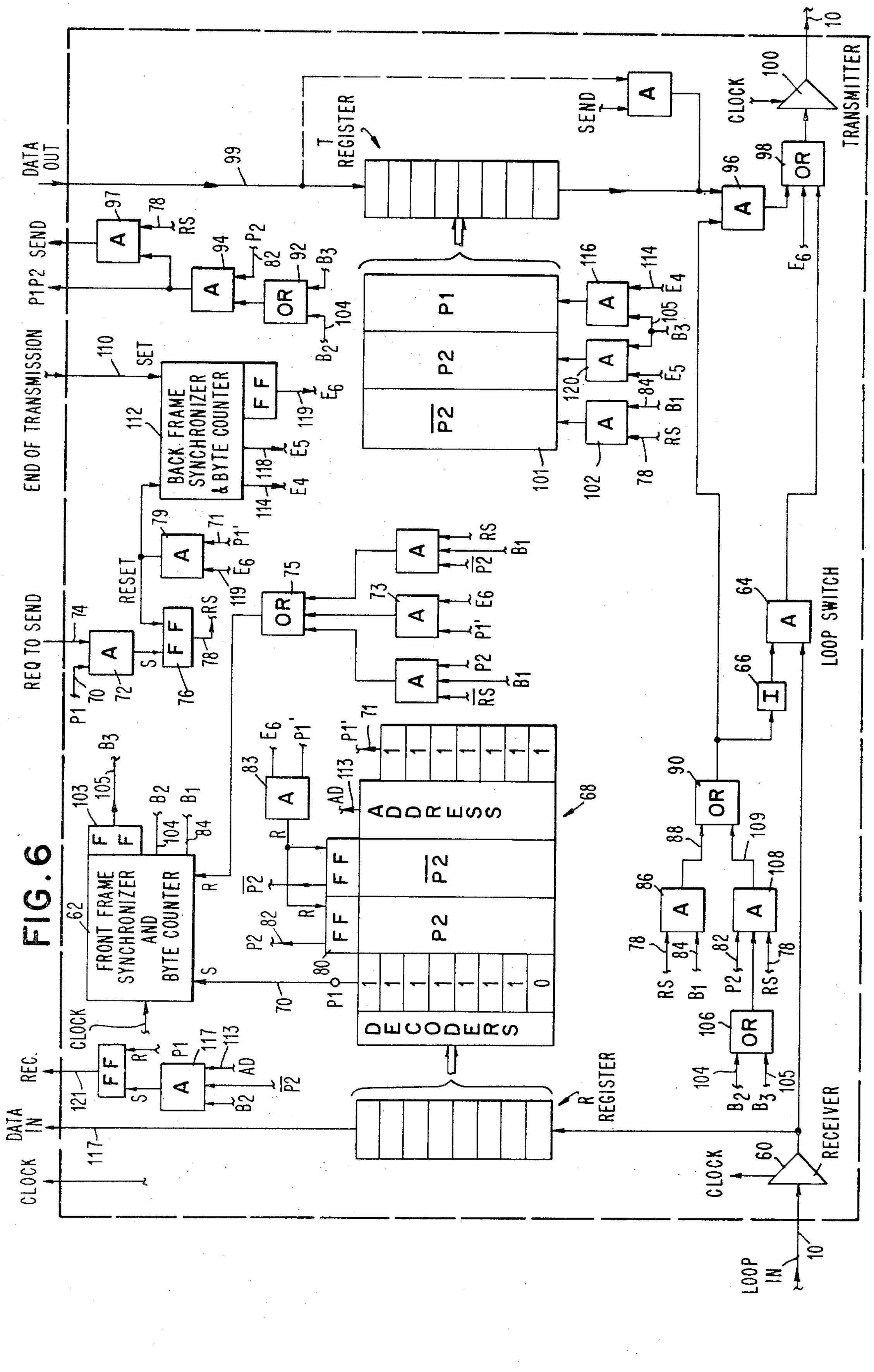
FIG. 6 is a more detailed schematic diagram of the interface shown in FIG. 2.

Referring to FIG. 6, a detailed logic diagram of the interface illustrated in FIG. 2 is shown. In the transmit mode, the first character to be received by receiver 60 from loop 10 is a P1 character. The receiver institutes clock pulses which are sent to the device in the single loop case or to the sub-loop controller in the hierarchical system. The clock pulses are also entered into a front frame synchronizer 62 which includes a byte counter. For the purpose of illustration, the loop switch is embodied as AND circuit 64 which is normally closed by virtue of being ANDED with the output of inverter 66. Other techniques may be used to implement the switch. Therefore, the P1 character is transmitted to the other stations. The P1 character is also entered into the receive register R. As previously mentioned, the P1 character is a unique character in the form of 7 one bits followed by an eighth bit which is a zero bit.

The P1 character is entered into a group of decoders 68 and is decoded in the P1 decoder. The comparison produces a signal on lead 70 which will be referred to as the P1 signal because it was generated as a result of decoding the P1 character. The signal on lead 70 sets the front frame synchronizer 62. The P1 signal on lead 70 is also applied to AND circuit 72. If the sub-loop control unit connected to the interface of FIG. 6 has messages to send, a request-to-send signal will be present on lead 74 and AND circuit 72 will be gated and will set flip-flop 76, thereby producing an output signal on lead 78 which will be referred to as "RS" indicating request to send. During the next byte-time (B1), front frame synchronizer 62 produces a B1 signal on lead 84. The RS signal on lead 78 and the B1 signal on lead 84 are connected to AND circuit 86 which will thereby produce an output signal on lead 88 which is transmitted to OR circuit 90. The output signal from OR circuit 90 is applied through inverter 66 and causes AND circuit 64 to be degated and be in the open switch position. The output signal from OR circuit 90 is also applied to AND circuit 96 to allow the interface to transmit. The B1 signal on lead 84 and the RS signal on lead 78 are also connected to an AND circuit 102, the output of which causes a $\overline{P2}$ signal to be shifted into the transmit register T. Since AND circuit 96 is now gated, the $\overline{P2}$ signal will be transmitted through AND circuit 96, OR circuit 98 and the line transmitter 100 to the next interface indicating that it may not transmit. Meanwhile, since one byte-time has occurred, the front frame synchronizer now produces an output signal B2 on lead 104.

If a P2 character follows the P1 character, it is entered into register R and decoded in the decoder 68, thereby setting flip-flop 80 which produces a signal on lead 82 which will be referred to as the P2 signal. The B2 pulse is also applied through OR circuit 106 and is connected as an input signal to AND circuit 108 along with the P2 signal on lead 82 and the RS signal on lead 78. The output from AND circuit 108 is transmitted through OR circuit 90, the output of which maintains the loop switch AND circuit 64 in the open condition and it also is applied as an input signal to AND circuit 96 to permit the message to be transmitted through OR circuit 98 and the line transmitter 100 where it is transmitted along the loop.

The B2 signal on lead 104 is also applied through OR circuit 92 as an input to AND circuit 94 along with the P2 signal on lead 82. The output of AND circuit 94 is applied as an input to AND circuit 97 along with the RS signal on lead 78. The output from AND circuit 97 is a "send" signal which is sent to the sub-loop control unit to indicate that a message may be transmitted out. The destination address is transmitted from the sub-loop control unit on lead 99 and it may be transmitted through the transmit register T or alternatively, lead 99 may by-pass the register and be applied directly to AND circuit 96 as shown by the dotted lines.

At the end of the B2 byte-time, B3 latch 103 is set and a B3 signal appears on lead 105. The signal on 105 remains on during the rest of the transmission, thus maintaining gates 64 open and 96 closed. When all the data has been transmitted, the sub-loop control unit or the device as the case may be transmits an end-of-transmission signal on lead 110 to a backframe synchronizer 112 that includes a byte counter. The backframe synchronizer 112 produces an E4 signal on lead 114 that is connected along with the B3 signal on lead 105 to AND circuit 116, the output of which introduces a P1 character from storage means 101 into the transmit register T which is transmitted through AND circuit 96 and OR circuit 98 immediately following the message. The backframe synchronizer 112 then produces an E5 signal on line 118. The E5 signal on line 118 is applied along with the B3 signal to AND gate 120, the output of which transfers a P2 character from storage means 101 into the transmit register T which is transmitted out through AND circuit 96 and OR circuit 98. Thus, the message is followed by a P1 and a P2 character. From the description above, it is seen that if the interface receives a P1 character followed by a P2 character, the interface will transmit a $\overline{P2}$ along the line and will then allow a message or messages to be sent from the sub-loop control unit or the device. After the messages are transmitted, the interface will then transmit a P1 and a P2 character.

When the E5 signal on lead 118 from the back frame synchronizer 112 ceases an E6 signal is produced on lead 119. The E6 signal on lead 119 is connected through OR circuit 98 to transmitter 100. This has the effect of producing a string of 1 bits on the loop 10 after the P2 signal has been transmitted. The string of 1 bits are used for synchronizing the other interfaces in the loop and will occur during the duration of the E6 signal which may be prolonged for some selected convenient time. The P1 signal which was transmitted by the interface at the end of the message will circulate along the loop and be received by all the other interfaces in the loop. However, it will also return back to the interface of FIG. 6 that generated it after having been delayed during at least two byte-time for example, in the loop controller. The first 7 bits of the P1 signal are 1 bits; when they enter into register R and are compared with the 7 one bits stored in the rightmost portion of decoder 68, the comparison produces a P1′ signal on lead 71. The function of the P1′ signal is to reset the various portions of the interface unit while the E6 signal is still present and to close the switch 64 to pass the rest of the message down the line. Thus, the E6 signal on lead 119 and the P1′ signal on lead 71 are applied to AND circuit 79, the output of which is used to reset flip-flop 76 and the backframe synchronizer 112. The E6 signal and the P1′ signal are also applied to AND circuit 83 to reset the flip-flops in decoder 68. Likewise, the P1′ signal and the E6 signal are applied to AND circuit 73, the output of which is transmitted through OR circuit 75 to reset the front frame synchronizer 62. Thus, the interface unit of FIG. 6 is reset to its initial condition, the switch 64 is closed and switch 96 is open. The interface is ready to receive other messages and to transmit on another cycle upon request of the attached device. The next incoming bit is the last bit (0) of the P1 character which had circulated around the loop; it is passed to the next station and interpreted as the last bit of a P1 character, the former bit being issued by the interface itself with the help of E6 and OR gate 98. The 0 bit is followed by a $\overline{P2}$ character and by a message which can be addressed to a station located between the interface which just finished transmitting and the next interface which took control of the loop.

The interface of FIG. 6 also receives messages from other interfaces via loop 10. In the receive mode, the message will be preceded by a P1 character and a $\overline{P2}$ character indicating that the interface may receive but not transmit. The P1 character is compared in decoder 68 and sets the front frame synchronizer 62 by the P1 signal on lead 70 and the synchronizer begins to generate the B signals. At B1 the $\overline{P2}$ character is compared in decoder 68, it produces the $\overline{P2}$ signal. At the same time that the B2 signal is produced from synchronizer 62, the address of message is compared in decoder 68 and if the message is addressed to the particular associated sub-loop or device, decoder 68 generates an address signal "AD" on lead 113. The B2, $\overline{P2}$ and AD signals are applied to AND circuit 115 which sets REC-flip-flop 117 which generates a "REC" signal on lead 121 which informs the sub-loop control unit or the device that a message is to be received. The message is sent to the sub-loop control unit via receive register R. The P1 character which follows the message is decoded and the resultant signal on lead 70 is used to reset REC-flip-flop 117.

Figure 7:
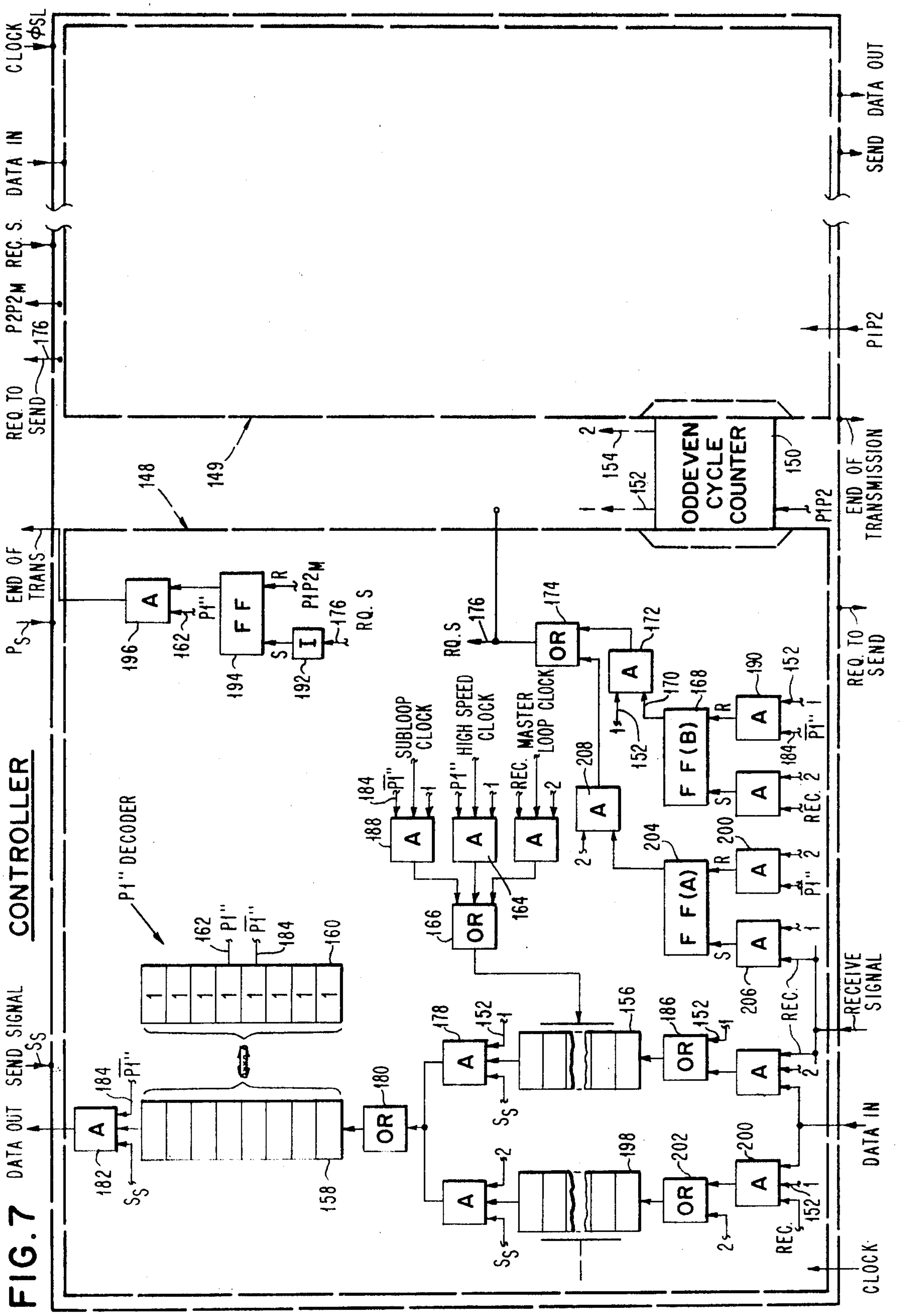
FIG. 7 is a more detailed schematic diagram of the sub-loop control unit shown in FIG. 4.

FIG. 7 shows in detail a possible implementation of the logic circuits for the sub-loop control unit of FIG. 5.

In FIG. 7, the sub-loop control unit consists of two basic blocks, one (148) shown in detail on the left, and 149 located on the right, which is similar to the block 148 but it is merely inverted. Considering the block on the left with the detail logic, it contains two registers, 156 and 198 which are the buffers 30-1 and 30-2 of FIG. 5. During any given cycle, one of the registers will, for example register 156, have information from the previous cycle which is transmitted to the sub-loop interfaces and the other register 198 is used for storing messages from the master loop interface. The only difference in the block on the right that is not shown in detail is that the information is obtained in from the sub-loop interfaces at a given cycle at the same time previous information is being transferred to the master loop interface. In FIG. 7, it is assumed that a sub-loop interface is connected to the top of the unit and that a master loop interface is connected to the bottom of the unit.

Referring to FIG. 7, the system includes an odd-even cycle counter 150 which puts an output signal on either of two lines, 152 or 154 in response to the P1, P2 signals from the master loop. The signal on 152 will be known as the 1 signal and the signal on 154 will be known as the 2 signal. For purposes of explanation, it will be presumed that from a previous cycle, register 156, which can be in the order of 2,000 bits long contains the messages received from the master loop during that preceding cycle and it also presumed that the messages have not completely filled register 156 so, therefore, they are preceded in the register by a series of one bits. The manner in which the one bits were placed in the register 156 will be seen from a later explanation. We presume, also, that the odd-even cycle counter 150 is putting an output on the 1 line, that is line 152. Also, during the previous cycle, register 158 which is an 8 bit register is filled with ones. The presence of 8 "1" bits in register 158 causes decoder 160 to generate a P1'' signal on lead 162. The P1'' signal on lead 162, and the 1 signal on lead 152 are combined at AND circuit 164 along with the output of a high speed clock which is not shown. AND circuit 164 is gated and its output is sent through OR circuit 166.

Also, during the previous cycle, a flip-flop 168 had been set such that a signal appears on lead 170. This signal is ANDED by the 1 signal on lead 152 at AND circuit 172 which is applied through OR circuit 174 on output lead 176. The signal on lead 176 is designated RQS. This was the same request to send signal that was discussed with relation to FIG. 6 which appeared on line 74 and ultimately caused an output signal S from AND circuit 97 of FIG. 6. Thus, a send signal which is designated $S_S$ is applied to AND circuit 178 along with the 1 signal on lead 152. Thus the output from OR circuit 166 is able to gate the message through AND circuit 178 and OR circuit 180 into and through register 158. However, what is being shifted are still the one bits that preceded the message originally stored in register 156. They are shifted out of the register but do not get through AND gate 182 because AND gate 182 is not enabled at this time, because one of its inputs is a $\overline{P1''}$ on lead 184. Lead 184 comes from decoder 160 and as previously stated there is no signal on 184 at this time. As the one bits and the succeeding message begin to leave register 156, the register positions will begin to fill with one bits because the input to register 156 is OR circuit 186 which has an input lead 152 which is the 1 signal from odd-even cycle counter 150. This streaming operation will continue until the message portion of the contents of register 156 begin to enter register 158. At this time, there will no longer be a series of 8 one bits in register 158 and, therefore, the decoder 160 will generate a $\overline{P1''}$ on lead 184 and the P1'' signal on lead 162 will cease. The $\overline{P1''}$ signal on lead 184, as previously stated, is connected to AND circuit 182 and AND circuit 182 becomes enabled permitting the message data to be transmitted out to the sub-loop interface which is shown in FIG. 6. Simultaneously with the gating of AND circuit 182, there is a change in the clock which is to be used. This occurs because the P1'' signal on lead 162 is no longer applied to AND circuit 164. However, now that there is a $\overline{P1''}$ signal on lead 184, AND circuit 188 will be gated and the sub-loop clock (not shown) will be transmitted through OR circuit 166 and the message will be transferred out of register 156 at the sub-loop clock rate. Thus, the message is clocked out onto the sub-loop and the register positions vacated by the message bits are filled with one bits as a result of the output of OR circuit 186. These one bits will be clocked into register 158 until register 158 is filled with 8 one bits. When register 158 is filled with 8 one bits, decoder 160 will again generate a P1'' signal on lead 162 and the $\overline{P1''}$ on lead 184 ceases. Thus, AND circuit 182 is disabled.

Another operation occurs when the message first entered register 158. It was previously stated that this occurrence caused the $\overline{P1''}$ signal on 184 to be present. This $\overline{P1''}$ signal on lead 184 is connected along with lead 152 from the odd-even cycle counter to AND circuit 190 thereby resetting flip-flop 168 and ultimately causing the RQS signal on 176 to cease. When the RQS signal on lead 176 ceases, the result is an output signal from inverter 192 which sets flip-flop 194. However, as previously stated, at the end of the message, the P1'' signal becomes present on lead 162 and this signal along with the output from flip-flop 194 enables AND gate 196. This produces the end of transmission signal which is the same as appears on lead 110 of FIG. 6.

What has been described thus far is the manner in which messages received from the master loop on a previous cycle and which were stored in register 156 are transmitted out during the present cycle through register 158 to the output where the messages are received by the sub-loop interface and are ultimately sent to the proper devices at a function of the addresses. At the same time that this operation was occurring, messages from the master loop addressed to stations associated with the particular sub-loop control were being entered into register 198. The manner in which this occurs is as follows. The receive line which is an output from the master loop interface is connected to AND circuit 200 along with the 1 signal on lead 152 and are gated with the "data in" line from the master loop interface. Thus, the input messages are gated through AND circuit 200 and OR circuit 202 and are entered into register 198 under the control of the master loop clock which is connected to register 198 in a manner similar to the clock arrangement shown connected to register 156 but which is not shown for purposes of clarity. At the same time, flip-flop 204 is set to memorize during the next cycle that a message has been stored in register 198.

Upon the occurrence of the next cycle, that is, the receipt of the next P1, P2 signal from the master loop, the odd-even cycle counter 150 will switch and the "2" signal on lead 154 will be activated. However, this merely means that the other circuitry such as flip-flop 204, AND circuit 206, AND circuit 208, etc., will come into play but in the same manner as the circuits just previously described. The only difference will be that the messages will be shifted out of register 198 and new messages during this next cycle will be shifted into register 156.

The operation previously described illustrated how messages could be obtained from the master loop interface and transmitted out to the sub-loop interface. The right side of FIG. 7, (box 149), contains similar registers and control circuits as previously described but in an inverted manner such that information is brought from the sub-loop interface and transmitted out to the master loop interface but in a manner identical to that described for the left side of the drawing. Thus, it is not believed to be necessary to repeat the description of the operation.

In each of the loops, the master loop or the sub-loops the loop controller differs from the other interfaces in that it contains a loop clock and a two-byte delay device. The loop clock is for purposes of gating and synchronization, and the two-byte delay register is for purposes of byte resynchronization at the end of transmission as explained before. Those are straightforward type clock and delay register and are not shown in the detailed drawings.

What has been described is a hierarchical multi-loop data transmission method and system including a master loop and a plurality of sub-loops, each connected to the master loop via interfaces and a sub-loop control unit. Each sub-loop contains a plurality of digital devices which are connected to the sub-loop through interfaces. The devices transmit and receive message from other devices in their own or in other sub-loops. The transmission sequence is controlled by the sub-loop control units and the interfaces by use of special framing characters which allow the system to pass the ability to transmit from interface to interface. The invention is not limited to one level of sub-loops, further sub-sub-loops may be in turn connected to the sub-loops and so on.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A communication system comprising:

a closed master transmission loop;

a system control means that operates in discrete cycles, said master control means producing first and second framing characters at the beginning of each cycle;

an interface means connected to said system control means and said master loop, said interface means including a switch connected in said loop master for transferring said first and second framing into said master loop for transmission around said master loop;

a plurality of transmission sub-loops, each of said being connected to said master loop by a first interface connected to said master loop, each having a sub-loop control unit connected to said first interface, and a second interface connected to said sub-loop control unit and to a separate transmission sub-loop;

each of said transmission sub-loops having a plurality of stations connected thereto, said stations being operable to transmit and receive digital messages;

each of said sub-loop control units having a first storage means for storing messages to be transmitted from its associated sub-loop and a second storage means for storing messages to be received by its associated sub-loop;

a first one of said sub-loop control units being responsive to said first and second framing characters to permit transmission of messages from its first storage means onto said master loop and concurrently producing a third framing character to prevent transmission from the other sub-loop control units.

2. A communication system according to claim 1 wherein said first one of said sub-loop control units produces said first and second framing characters and transmits said characters onto said transmission line after the transmission of the messages from said first sub-loop control unit to permit a second sub-loop control unit to transmit messages, said second sub-loop control unit also transmitting a third framing character onto said master loop to prevent the remaining sub-loop control units from transmitting.

3. A communication system according to claim 1 wherein each of said interfaces includes a receive register connected to said master loop on one side of the said switch therein and a transmit register connected to the master loop on the other side of said switch;

a decoder connected to said receive register for detecting and producing signals upon the receptors of said first, second and third framing characters;

a storage means connected to said transmit register for providing first, second and third framing characters to said transmit register;

and control means connected to said decoder means and said storage means for controlling the sequence of operation thereof.

4. A communication system according to claim 1 wherein each of said sub-loop control unit includes means for receiving messages from said interface connected to said master loop;

means for storing said messages from said master loop for one cycle of operation;

and means for thereafter transmitting said messages from said master loop through said interface connected to said sub-loop;

means for receiving messages from said interface connected to said sub-loop;

means for storing said messages from said sub-loop for one cycle of operation;

and means for thereafter transmitting said messages from said sub-loop through said interface connected to said master loop and onto said master loop.

* * * * *